US006119135A

United States Patent [19]
Helfman

[11] Patent Number: 6,119,135
[45] Date of Patent: Sep. 12, 2000

[54] METHOD FOR PASSIVELY BROWSING THE INTERNET USING IMAGES EXTRACTED FROM WEB PAGES

[75] Inventor: Jonathan Isaac Helfman, Albuquerque, N. Mex.

[73] Assignee: AT&T Corporation, New York, N.Y.

[21] Appl. No.: 08/784,277

[22] Filed: Jan. 15, 1997

Related U.S. Application Data

[60] Provisional application No. 60/011,435, Feb. 9, 1996.

[51] Int. Cl.⁷ ..................................................... G06F 17/30
[52] U.S. Cl. ............................ 707/513; 707/501; 709/218
[58] Field of Search ..................................... 707/513, 501, 707/526; 345/302; 709/203, 218

[56] References Cited

U.S. PATENT DOCUMENTS

| | | | |
|---|---|---|---|
| 4,677,434 | 6/1987 | Fascenda | 380/23 |
| 4,745,559 | 5/1988 | Willis et al. | 364/514 |
| 5,131,020 | 7/1992 | Liebesny et al. | 379/59 |
| 5,206,722 | 4/1993 | Kwan | 358/86 |
| 5,321,750 | 6/1994 | Nadan | 380/20 |
| 5,327,554 | 7/1994 | Palazzi, III et al. | 395/600 |
| 5,379,421 | 1/1995 | Palazzi, III et al. | 395/600 |
| 5,404,505 | 4/1995 | Levinson | 395/600 |
| 5,465,401 | 11/1995 | Thompson | 455/89 |
| 5,512,935 | 4/1996 | Majeti et al. | 348/9 |
| 5,524,146 | 6/1996 | Morrisey et al. | 379/207 |
| 5,623,589 | 4/1997 | Needham et al. | 345/356 |
| 5,708,767 | 1/1998 | Yeo et al. | 345/302 |
| 5,740,549 | 4/1998 | Reilly et al. | 705/14 |
| 5,781,189 | 7/1998 | Holleran et al. | 345/335 |
| 5,793,368 | 8/1998 | Beer | 345/334 |
| 5,808,613 | 9/1998 | Marrin et al. | 707/501 |
| 5,903,904 | 5/1999 | Peairs | 707/526 |
| 5,959,623 | 9/1999 | Van Hoff et al. | 345/333 |
| 5,987,510 | 11/1999 | Imai et al. | 703/203 |

OTHER PUBLICATIONS

Takahi Hiroki et al., "World Wide Web–jo no Kokai–gata Gazo Kensaku Shisutemu Girls", Technical Report of the Istitute of Electronics, Information, and Communication Engineers (Japan) v. IE95–76, pp. 1–8, Nov. 1995.

Takaha, Hiroki et al. "The Open Image Retrieval System 'Girls' on the World Wide Web" a Translation of Tech. Report of the Institute of Electronics Information, and Commuication Engineers (Japan) v. IE95–76, pp. 1–15, Nov. 1998.

International Buisness Machines, Inc. Techical Disclosure Bulletin, vol. 37, No. 4A, "Contextual Search for Multimedia Presentation", pp. 139–141, Apr. 1994.

Dodge, Chris et al, "Web Cataloguing through Cache Exploitation and Steps toward Consistency Maintenance", Computer Networks and ISDN Systems, vol. 27, No. 6, pp. 1003–1008, Apr. 1995.

Lemay, Luara et al., "Teach Yourself Web Publishing with HTML", Indianapolis: Sams Publishing, ISBN# 0–672–30667–0, pp. 158–181, 296–343, Jan. 1995.

(List continued on next page.)

*Primary Examiner*—Mark R. Powell
*Assistant Examiner*—J. Rossi
*Attorney, Agent, or Firm*—Kenyon & Kenyon

[57] ABSTRACT

A technique is provided for passively browsing the Internet or an intranet by displaying images from web pages on a user's display screen. The user can select an image by clicking on it using a pointer manipulated by a mouse or trackball. A mapping list is maintained that maps the image universal resource locator (URL) for each image to the URL of the web page containing the image. Using the mapping list, the user's web browser can be driven to the web page associated with the image selected by the user. A group of web pages may be defined based on the results of a search, by entering URLs for sites or web pages of interest, using a bookmarks file, based on the currently displayed web page in a web browser, or by determining which web pages are associated with the images stored in an image cache.

20 Claims, 9 Drawing Sheets

DISPLAY

OTHER PUBLICATIONS

"Moon Valley's NetCruiser CD and More," Newsbytes News Network (Journal), Nov. 16, 1994.

"Personalized Newspapers: Crayon on the Internet," CIP Executive Briefings, Jul. 15, 1995.

"What's New Online," Interactive Content, Aug. 1, 1995.

"PointCast Announces Journalist 3.0 for CompuServe; New Version Delivers Enhanced Ease-of-use And Functionality," Business Wire, Aug. 10, 1995.

"Create a Custom Newspaper," PC World, Aug. 1995.

"Tired of Waiting for Web Pages to Load? Go Offline," Media Daily, Jan. 19, 1996.

"Put the World Wide Web to Work," Windows Sources, Feb. 1996.

"Interview: Rich Zahradnik, CNNfn Interactive," Interactive Content, Feb. 1, 1996.

L. Niles, G. Kopec, and L. Masinter, "Multipage Document Images on the Internet," *Multimedia Computing and Networking* 1996, also *Proceedings SPIE—The International Society for Optical Engineering*, vol. 2667, Jan. 29–31, 1996, San Jose, California, pp. 282–289.

T. K. Kirste and W. Hubner, "An Open Hypermedia System for Multimedia Applications," *Multimedia Systems, Interaction and Applications Eurographics Workshop*, Apr. 18, 1991, Chapter 17, pp. 225–243.

T. Norderhaug and J. M. Oberding, "Designing a web of intellectual property," *Computer Networks and ISDN Systems 27*, (1995), pp. 1037–1046.

E. A. Meyer and P. E. Murray, "Borealis Image Server," *Computer Networks and ISDN Systems 28*, (1996), pp. 1123–1137.

METHOD FOR PASSIVELY BROWSING THE INTERNET USING IMAGES EXTRACTED FROM WEB PAGES

This application claims the benefit of U.S. provisional application No. 60/011,435, filed Feb. 9, 1996.

FIELD OF THE INVENTION

This invention relates to data networks such as the Internet and intranets, and more particularly, to passively browsing for information by viewing images.

BACKGROUND OF THE INVENTION

A frustrating aspect of the information revolution is that the ease of accessing on-line material has not kept pace with the growth in the amount of material that is available. For example, advances in hardware, compression techniques, editing tools, and web browsers have facilitated the creation of material containing inlined images (images that appear on a web page with text). Inlined images are a popular way in which to create eye-catching text and graphics that would be difficult or impossible to create using the capabilities of hypertext markup language (HTML). However, accessing web pages with interesting inlined images typically involves browsing through web pages of material by clicking on hypertext links. Although browsing in this way is often rewarding, it requires a good deal of attention on the part of the person who is browsing and can be burdensome.

It is therefore an object of the present invention to provide a way in which to facilitate the access and display of Internet or intranet images and the material associated with the images.

SUMMARY OF THE INVENTION

This and other objects of the invention are accomplished in accordance with the principles of the present invention by providing a system in which a user can display web page images on a computer screen. When the user is interested in a particular image, the user can select the displayed image by clicking on it with a mouse or trackball.

The system maintains a mapping list that maps the universal resource locator (URL) of the displayed web page images to the URL of the web page containing those images. When a user selects a displayed image, the user's browser is driven to the associated web page, so that the user can view the web page in its entirety.

The group of web pages containing the images to be displayed can be obtained in various ways. For example, a search engine can be used to locate web pages based on certain search criteria. Web page or web site URLs can be entered manually or by using a cut and paste operation from an application running in an open window. A bookmarks file containing various URLs can also be used to define a group of web pages. Web pages can be obtained based on the URL for the currently displayed page in an active web browser. A recursive retrieval process can be used to obtain multiple groups of linked web pages. Regardless of how the group of web pages is defined, the system extracts embedded image URLs from the web pages and forms a list mapping the extracted image URLs to the URLs of the web pages associated with those images.

If desired, web page images can be obtained from an image cache. For example, in a system having a proxy server connection to the Internet, images are stored in a proxy server cache whenever web pages are retrieved. The proxy server contains a log file that can be parsed to construct a list that maps images to associated web pages.

Images may be displayed on the user's display in random positions, in a non-overlapping pattern, or arranged by size, etc. The user's client computer maintains a data list of coordinates so that when the user clicks on a given image, the client can determine which image has been selected. The mapping list is used to determine which web page URL corresponds to the selected image. The user's web browser is driven to the URL of that web page.

The user can passively browse the Internet or an intranet by observing the displayed images. Web page images typically contain lively text and graphics, so it is relatively easy for users to quickly review a large amount of material. When images are obtained from an image cache or from web pages associated with the URL for a currently displayed page of an active web browser, no user input is required. When the user submits a search or a list of web page or web site URLs, only minimal user input is needed.

Further features of the invention, its nature and various advantages will be more apparent from the accompanying drawings and the following detailed description of the preferred embodiments.

DETAILED DESCRIPTION OF THE PREFERRED EMBODIMENTS

U.S. provisional application No. 60/011,435, filed Feb. 9, 1996, is hereby incorporated by reference herein.

Figure 1:
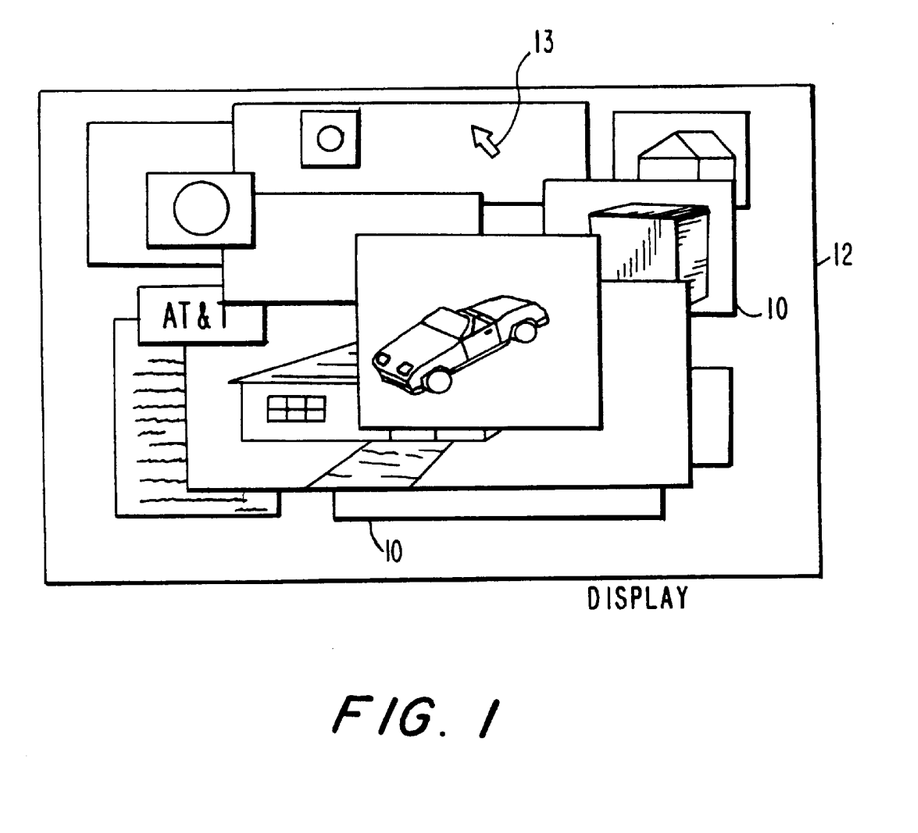
FIG. 1 is a diagram of an illustrative display screen on which various web page images have been displayed in random positions.

In accordance with the present invention, a user with a computer connected to a data network such as the Internet or an intranet can have web page images 10 displayed on computer screen 12, as shown in FIG. 1. Typical images include logos, art, and pictures of products and may, in general, include text. If the user observes an image of interest, the user can select that image by clicking on the image by manipulating pointer 13 with a pointing device such as a trackball or a mouse. When an image is selected, the user's web browser is automatically driven to the web page associated with the image. The user can browse the World Wide Web starting with that page.

Various techniques can be used to define the set of images that are presented on screen 12. If desired, the images can be obtained from an image cache. The contents of the cache varies continually as other users browse the Web and draw different images into the cache. As new images are added to the cache, they are displayed on screen 12. Because a variety of images are presented to the user without any user input, the user may browse the Internet or intranet passively. Another way in which to obtain images is to perform a search for web pages that meet certain predefined search criteria. The images displayed on screen 12 can be extracted from the web pages that match the search criteria. Similarly, a user can provide a list of certain universal resource locators (URLs) to define a set of web pages or web sites. The URLs can be entered by the user manually or by cutting and pasting from an application or can be supplied from a web browser's bookmarks file. The web page images are obtained from the web pages associated with the list of URLs. Web page images can also be obtained from web pages associated with the currently displayed page of an active web browser.

Figure 2:
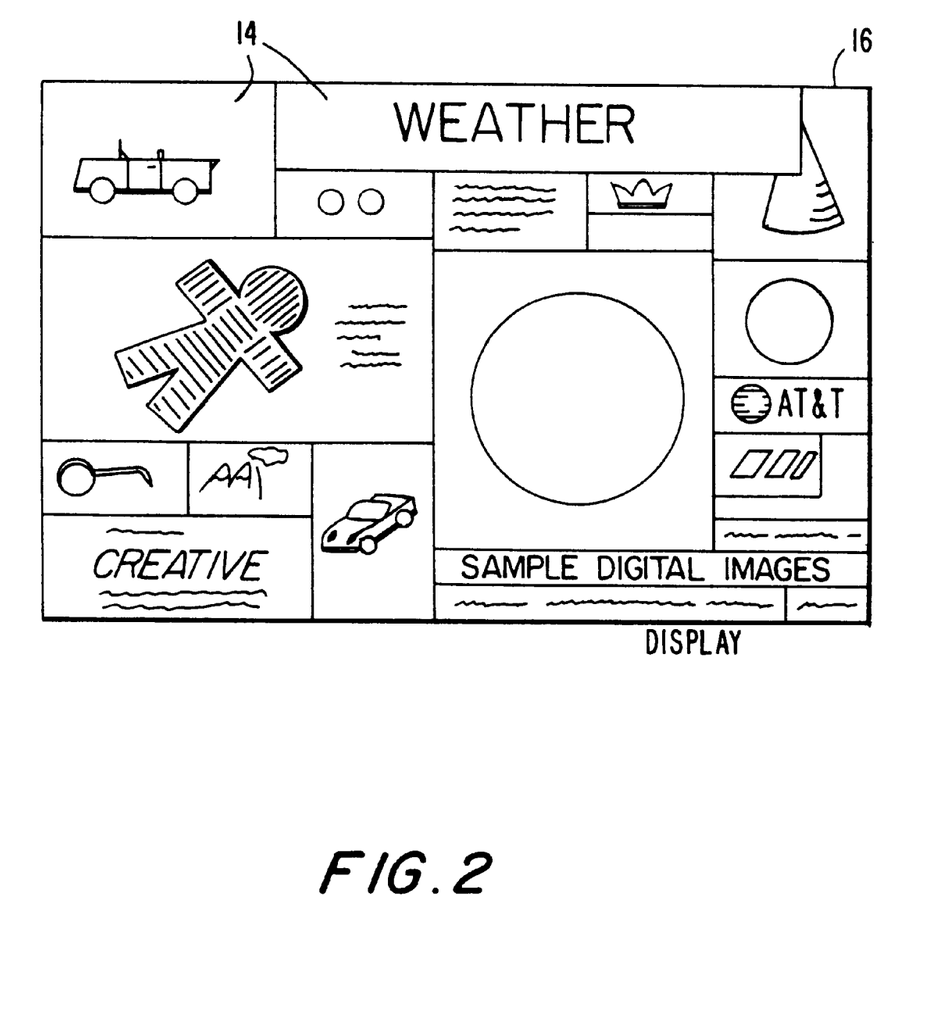
FIG. 2 is a diagram of an illustrative display screen on which various web page images have been displayed in a non-overlapping pattern.

If desired, web page images 14 can be displayed on computer display screen 16 in a non-overlapping pattern, as shown in FIG. 2. The pattern of FIG. 2 uses standard two-dimensional bin-packing algorithms to avoid the overlap associated with the random placement approach of FIG. 1. Another suitable display technique involves displaying images according to size (e.g., placing the largest images in the center of the display).

Figure 3:
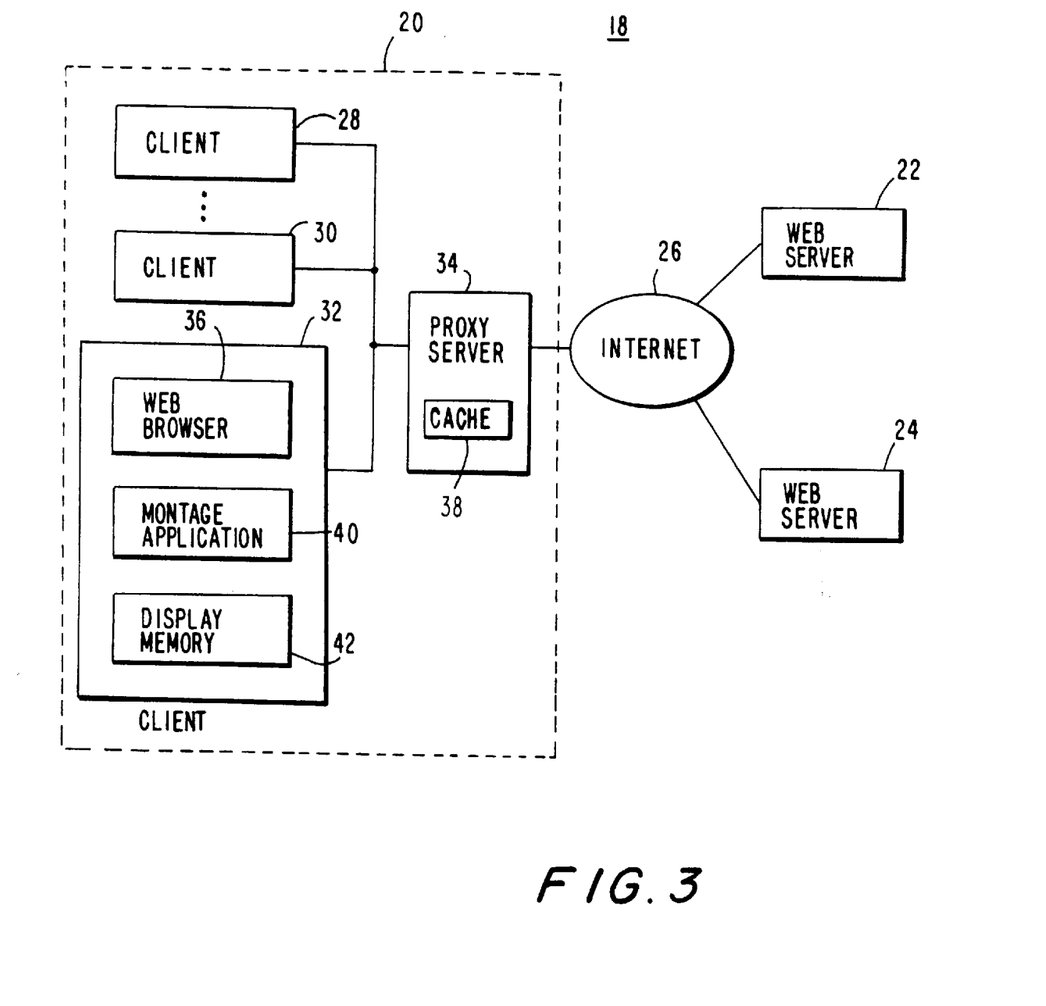
FIG. 3 is a diagram of a system that uses a proxy server in accordance with the present invention.

Images may be obtained from an image cache using system 18 of FIG. 3. In system 18, multiple clients are clustered together to form a local area network 20. Web servers 22 and 24, which are connected to a data network such as the Internet 26 or an intranet, supply web pages to clients 28, 30, and 32. Clients 28, 30, and 32 are connected to the Internet 26 through proxy server 34. Proxy servers are typically used in organizations that wish to provide a firewall machine between clients in a local area network and the Internet. Clients 28, 30, and 32 in local area network 20 contain standard web browsers, such as web browser 36 on client 32. Each web browser is configured to use proxy server 34 as its proxy server. When users browse the Internet 26, the web browsers request web pages from the proxy server 34. Proxy server 34 stores requested web pages and the images contained in or referenced from those web pages in cache 38. If no local copy of a requested page exists in cache 38 of proxy server 34, proxy server 34 retrieves the requested web page from the appropriate web server 22 or 24 via the Internet 26. Proxy server 38 also maintains a standard log file containing the URLs of the stored web pages and images.

A montage application, such as montage application 40 on client 32, may run on each client in local area network 20, but is illustrated only as running on client 32 to avoid over-complicating the drawing. Montage application 40 parses the log file maintained by proxy server 38 and creates a corresponding mapping list containing the URLs of the images in cache 38 and the URLs of the web pages associated with those images. Montage application 40 displays the images on the display of client 32 in a random pattern (e.g., as shown in FIG. 1), a non-overlapping pattern (e.g., as shown in FIG. 2), or in some other suitable arrangement.

As montage application 40 displays the images, montage application 40 maintains a list of coordinates that indicate the positions in which the images have been displayed. Montage application 40 awaits user input, so that when the user clicks on a given image, montage application 40 can determine which image has been selected and can drive web browser 36 to the web page associated with that image.

Images displayed on client 32 are stored in display memory 42. If desired, a user can save a snapshot of the currently displayed images. Information is saved with the snapshot that allows the user to click on the images within the snapshot to access the web pages associated with the images. Snapshots are preferably stored in the form of a web page. If the user wishes to share the snapshot, the user can install the web page containing the snapshot on a publicly accessible server and can provide the URL for that web page to interested parties.

Figure 4:
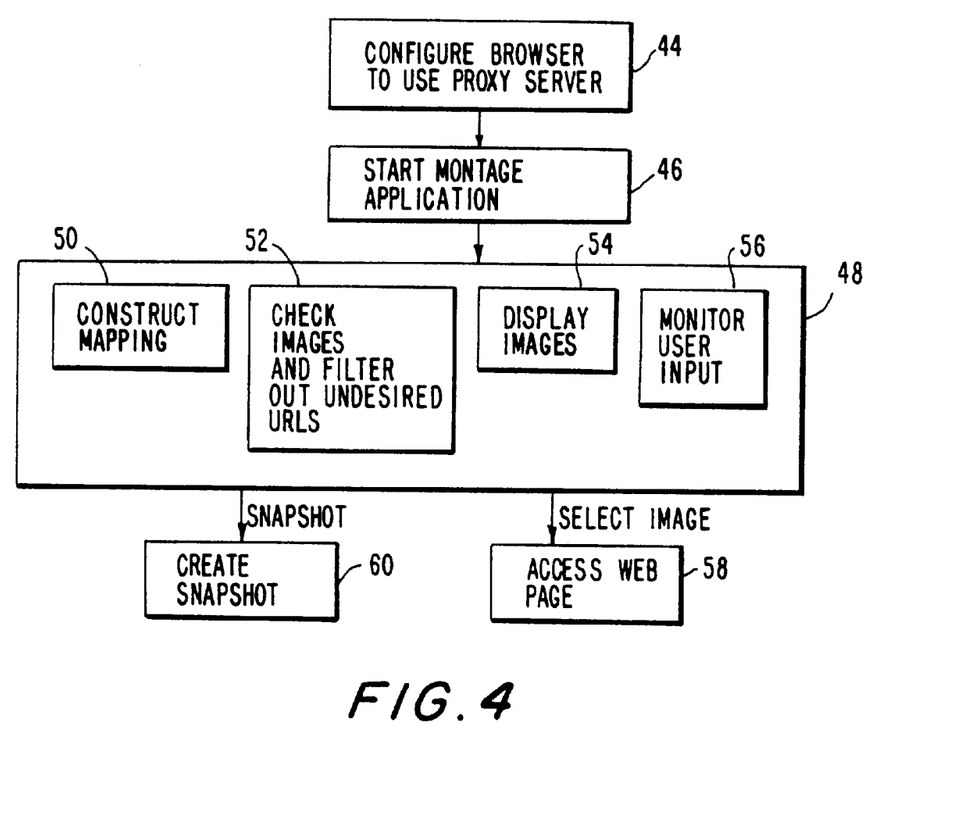
FIG. 4 is a flow chart of the steps involved in using the system of FIG. 3 to display images and access associated web pages.

The steps involved in using system 18 to display web page images and access the web pages associated with those images are shown in FIG. 4. At step 44, the user configures web browser 36 so that proxy server 34 is identified as the proxy server for client 32. This type of configuration ensures that web pages accessed by the clients running the montage application in local area network 20 will be stored in cache 38 and that entries will be made in a log file associated with proxy server 34 to indicate that the web pages have been cached. A suitable web browser 36 that allows the user to adjust the proxy server setup is the Navigator web browser of Netscape Communications Corporation. At step 46, the user starts the operation of montage application 40 (e.g., by clicking on an icon in a Microsoft Windows® environment).

At step 48, several concurrent processes implemented by montage application 40 are performed on client 32. In process 50, montage application 40 parses the standard log file maintained by proxy server 34 to construct a mapping list that maps the URL for each image listed in the log file to the URL of the web page associated with that image. To construct the mapping list, the log file on proxy server 34 must be readable by montage application 40.

In process 52, montage application 40 determines whether the images listed in the mapping file still exist in cache 38 (i.e., the images have not been overwritten) and, if the images exist, places the URLs of the images on a list of completely retrieved images. The disk of proxy server 34 used for cache 38 is preferably network mountable, so that montage application 40 running on client 32 can mount the disk (i.e., can access the image files in cache 38 as if they were local files on client 32). Local area network 20 preferably has standard network file system (NFS) capabilities. If desired, URLs that match text strings indicative of pornographic or otherwise offensive or unwanted content can be filtered out during process 52.

In process 54, montage application 40 displays the completely retrieved images from the list on the display of client 32 and maintains a list of the coordinates for each displayed image. In process 56, montage application 40 waits for input from the user (e.g., a click on a given image).

If a user selects an image by clicking at a certain coordinate, montage application 40 determines which image has been selected from the list of coordinates maintained during process 54 and uses the mapping list constructed during process 50 to drive web browser 36 to the web page that contains the selected image at step 58.

If a user selects the option "create snapshot," a snapshot image of the images in display memory 42 of client 32 is saved at step 60. The steps involved in creating a snapshot are shown in more detail in FIG. 5. The user enters the name of the directory where the snapshot data files are to be stored at step 62. The directory can be, e.g., a local directory on a disk on client 32. At step 64, the images currently in display memory 42 are saved as a snapshot image file in the selected directory. The current version of the coordinate list data indicating the coordinates of the displayed images and the URLs of the displayed images are stored in the directory as an image map coordinate file at step 66. At step 68, a new web page is created in the directory by montage application 40. The web page includes an image tag that specifies the URL of the snapshot image file, the name of the snapshot image map coordinate file, and indicates that the snapshot image file is of the image map type. The web page is installed on a suitable web server by the user or a system administrator at step 70 using conventional web page installation techniques.

Figure 5:
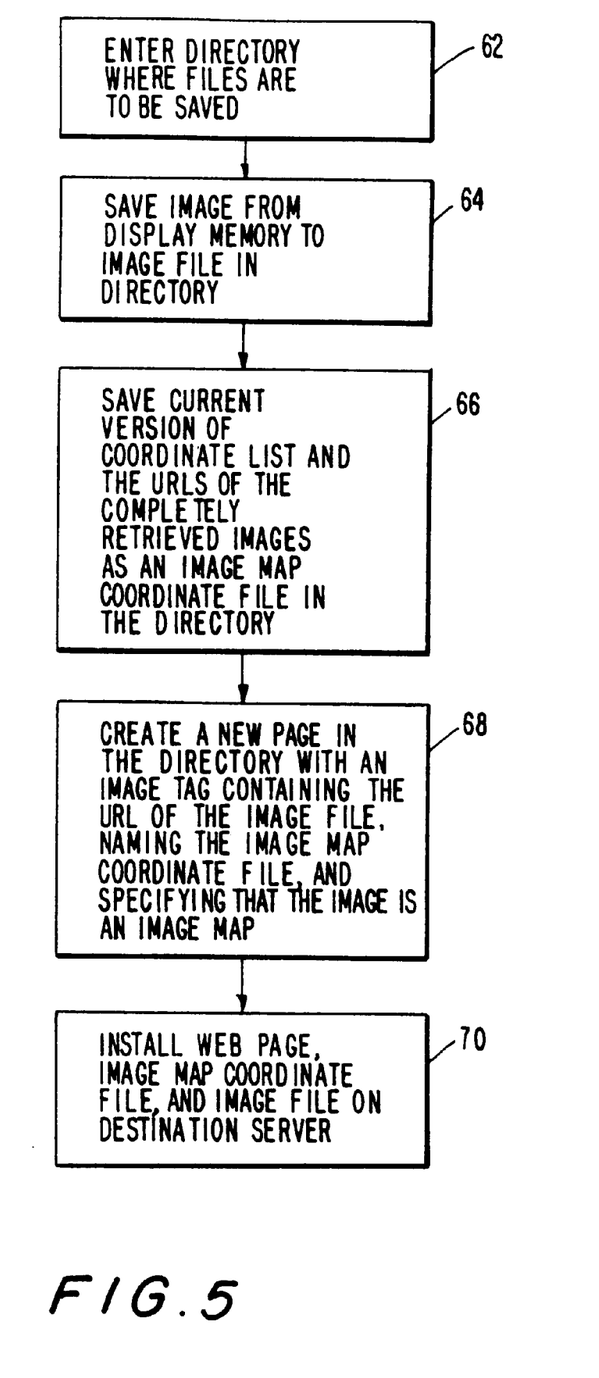
FIG. 5 is a flow chart of the steps involved in saving a snapshot of a number of web page images.

If desired, the user can "send" the snapshot to a friend, by communicating the URL of the snapshot web page to the friend (e.g., by e-mail, etc.). Because the snapshot has been installed on a web server, it may be accessed by anyone with the appropriate URL. When the accessing user clicks on a region of the snapshot image map, the user's web browser sends the coordinates of the user's selection to the web server along with the name of the image map coordinate file. The web server determines the URL of the web page associated with the selected region by searching through the image map coordinate file for the first region that contains the selected coordinates. The web server then sends back a command that drives the user's web browser to the web page associated with the image in the selected region.

In system 18 of FIG. 3, the various clients connected to proxy server 34 define a community of users. The web pages and images retrieved by the community of users are reflected in the contents of cache 38. Because montage application 40 displays the images stored in cache 38, the displayed images mirror the interests of the community of users.

Figure 6:
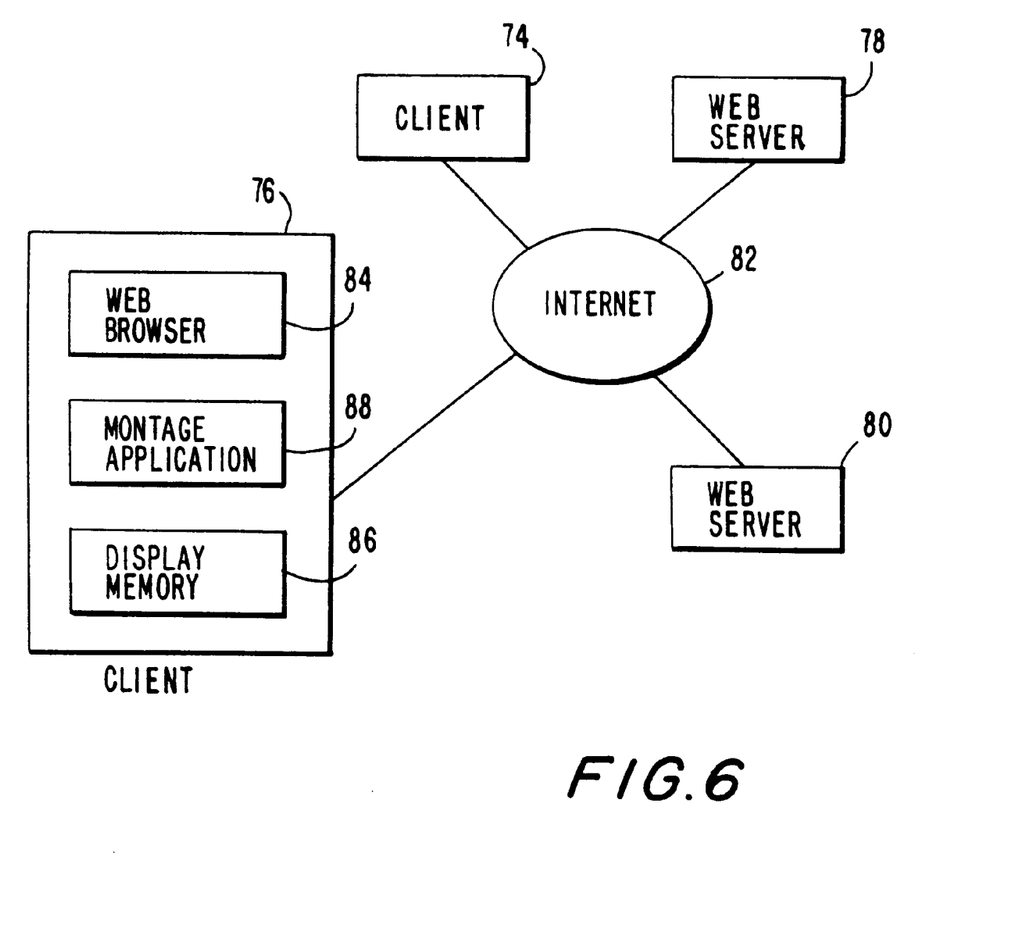
FIG. 6 is a diagram of a system with certain functions implemented using a local application in accordance with the present invention.

Another way in which images can be displayed involves performing a search or entering web site information. In system 72, clients 74 and 76 are interconnected with web servers 78 and 80 via the Internet 82, as shown in FIG. 6. The group of web images that are displayed on clients 74 and 76 may be based on a search, a list of URLs, a bookmarks file specified by the user, or the currently displayed page of an active web browser.

Client 76 has standard web browser 84, standard display memory 86, and montage application 88. Additional clients, such as client 74, may have the same configuration as client 76, but this detail is not included in FIG. 6 to avoid over-complicating the drawing. Montage application 88, which controls the display of web page images and the access of corresponding web pages, may be implemented in the Java programming language of Sun Microsystems. If montage application 88 is implemented in Java, it is run with a Java interpreter installed on client 76. With the arrangement of FIG. 6 and standard Windows® software, the user at client 76 can run Montage application 88 in one window and web browser 84 in another window. Because system 72 does not have a proxy server for client 76, system 72 may be somewhat slower in performing certain web page retrieval operations than system 18 (FIG. 3). However, system 72 does not require clients to be configured in a communal arrangement with a single proxy server. In addition, system 72 does not require client processes to be able to access log files and data files associated with a proxy server cache.

Figure 7:
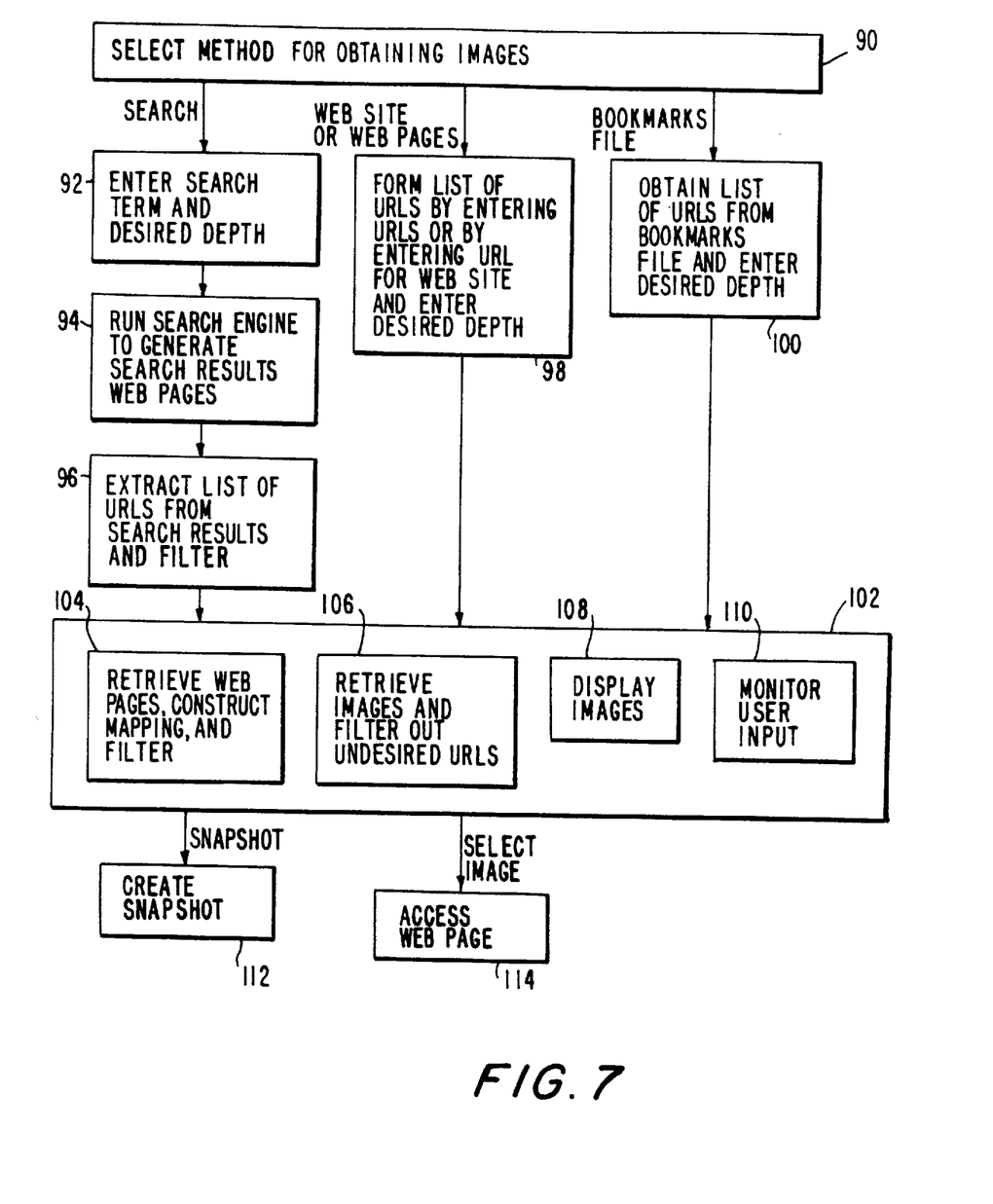
FIG. 7 is a flow chart of the steps involved in using the system of FIG. 6 to display images and access associated web pages.

The steps involved in using system 72 to display web page images and access the web pages associated with those images are shown in FIG. 7. At step 90, the user selects a method for obtaining web page images. For example, a user at client 76 clicks on an option presented on client 76 by montage application 88.

If the user selects the option "search," the user is provided with an opportunity to enter various search parameters at step 92. For example, the user can enter search terms for subjects of interest. Another item that the user can enter is the desired depth of web page links to be searched. At step 94, a search engine is run to generate one or more web pages of search results. At step 96, montage application 88 extracts a list of URLs from the search results web pages generated at step 94. If desired, a filter may be used at step 96 to ensure that the extracted URLs only correspond to sites other than the site of the search engine. This type of filter excludes links to commercial entities associated with the search engine service (e.g., links to Alta Vista services or Digital Equipment Corporation when the Alta Vista search engine of Digital Equipment Corporation is being used).

If the user selects the option "web site," montage application 88 provides the user the opportunity to enter URLs for web pages or web sites and a desired depth at step 98. URLs can be entered manually or may be entered with a cut and paste operation from an active application. If desired, step 98 can involve automatically deriving the URL for the currently displayed page of an active web browser. The URL can be obtained using a web browser with an Application Programmer Interface (API) that allows montage application 88 to query the web browser to determine the currently displayed page. Alternatively, the code for a web browser can be altered, so that the web browser provides montage application 88 with the URL of its currently displayed page. If desired, web browser 84 can be configured to use a dummy proxy server process (e.g., on client 76) to allow the URL of the current page to be ascertained by montage application 88.

If the user selects the option "bookmarks," montage application 88 presents the user with the opportunity to enter a desired depth and the name of various bookmarks files at step 100. Step 100 may also involve the conversion of the bookmarks files into a list of URLs, if necessary.

Several concurrent processes are performed at step 102. In process 104, montage application 88 uses the list of URLs and the desired depth to retrieve the group of web pages from which images are extracted. If the desired depth is 0, only the web pages corresponding to the URLs on the list are retrieved. If the desired depth is greater than 0, the web page retrieval process is iterated as needed. For example, if the depth is 1, web pages corresponding to links appearing on the web pages for the depth of 0 case are retrieved in addition to the web pages for the depth of 0 case. If the depth is 2, an additional layer of web pages is retrieved. As the web pages are retrieved, montage application 88 identifies the image URLs that are embedded in the web pages and constructs a mapping that associates each image URL to the URL of the web page that contains that image.

In addition, the web pages that are retrieved can be filtered during process 104. For example, montage application 88 might only retain web pages from the same site as initially entered by the user to ensure that the retrieved web pages are similar in content to the initially entered search. This filter can be used in conjunction with the type of filter used at step 96 (which excludes "same site" links). For example, during the few layers of web page retrieval the filter can exclude links to sites other than for the listed URLs, thereby ensuring that the retrieval process stays focused and is able to proceed past the initial menu pages common with many sites. After these first few layers, the filter can exclude links to the same site, thereby maximizing the breadth of the search at this stage. The user can enter the depth for each part of the web page retrieval filtering process.

In process 106, the image for each image URL in the mapping list is retrieved. If desired, images can be excluded during image retrieval process 106 if they correspond to web page URLs that match text strings indicative of pornographic or otherwise offensive or unwanted content. Whenever an image has been completely retrieved, that image is placed on a list of completely retrieved images.

In process 108, montage application 88 displays the completely retrieved images from the list on the display of client 76 and maintains a list of the coordinates for each displayed image. To display images on the display, image data is placed in display memory 86. In process 110, montage application 88 monitors user input.

If a user selects an image by clicking at a coordinate within the image, montage application 88 determines the image URL for the selected image from the list of image coordinates maintained in process 108 and uses the mapping list constructed in process 104 to drive web browser 84 to the web page that contains the selected image at step 114.

If a user selects the option "create snapshot," a snapshot image of the images in display memory 86 of client 76 are saved at step 112. The step of creating the snapshot involves the steps described in connection with FIG. 5.

Figure 8:
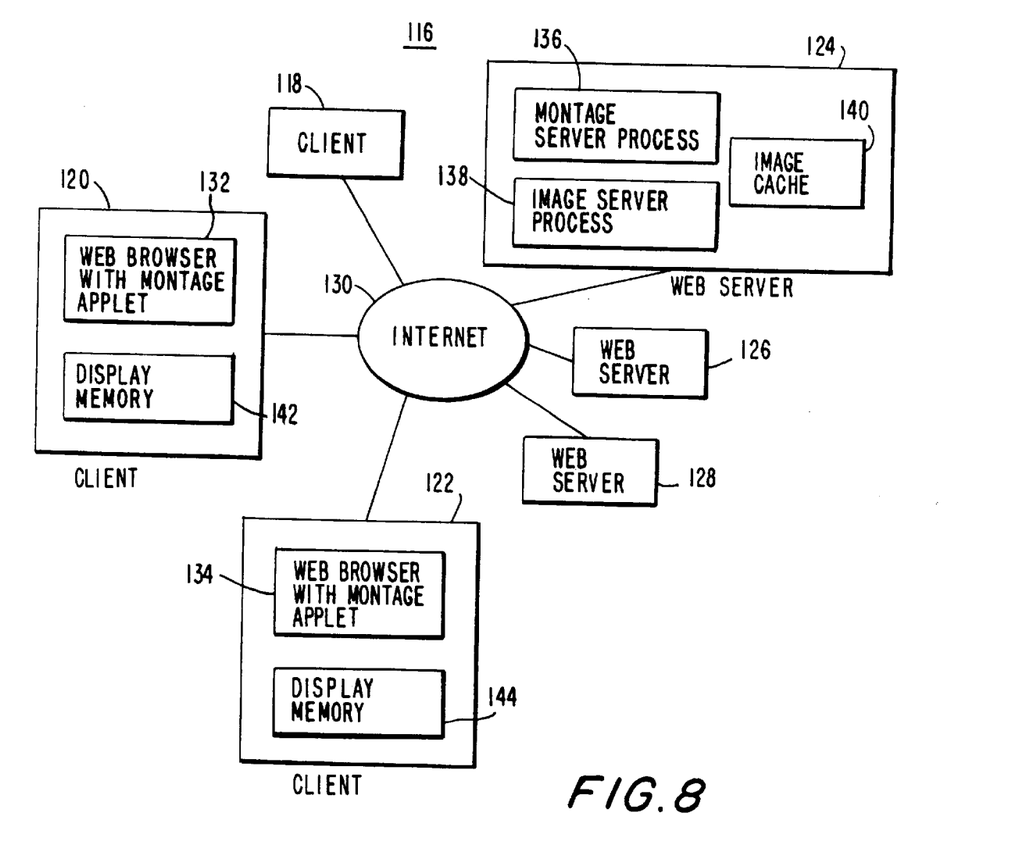
FIG. 8 is a diagram of a system with certain functions implemented using processes on a server and certain functions implemented using downloaded applets in accordance with the present invention.

Another arrangement that can be used is shown in FIG. 8. In system 116, clients 118, 120, and 122 are interconnected with web servers 124, 126, and 128 via the Internet 130 or an intranet. Web servers 126 and 128 provide web pages of Internet material. Web server 124 contains applets that may be downloaded by clients 118, 120, and 122 when it is desired to use the montage process. The downloaded applets can be combined with standard web browsers to form web browser with montage applet 132 and web browser with montage applet 134. The operation of web server 124 is controlled by montage server process 136 and image server process 138. The group of web images that are displayed on the clients by montage applets 132 and 134 may be obtained from image cache 140 or may be based on a search, a list of URLs, or a bookmarks file specified by the user.

Clients 118, 120, and 122 have standard display memories, such as display memories 142 and 144. Web browser with montage applet 132 and web browser with montage applet 134 (hereinafter montage applets) control the display of web page images and the accessing of corresponding web pages and are preferably implemented in the Java programming language of Sun Microsystems. The arrangement of FIG. 8 allows an interested user to download and run the code for the montage process without having a Java interpreter. In addition, the arrangement of FIG. 8 allows clients 118, 120, and 122 to be geographically remote from each other and from web server 124.

Figure 9:
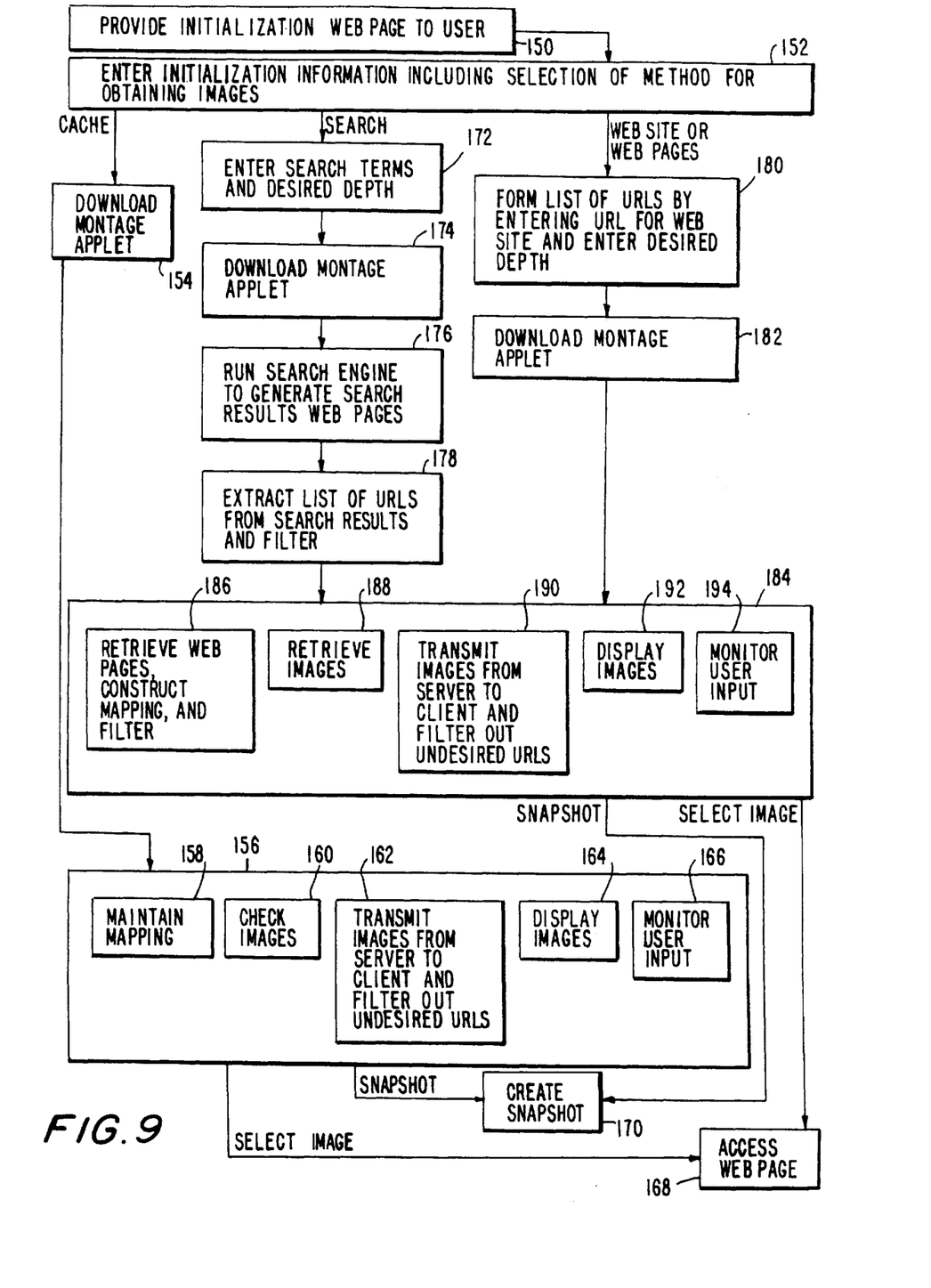
FIG. 9 is a flow chart of the steps involved in using the system of FIG. 8 to display images and access associated web pages.

The steps involved in using system 116 to display web page images and access the web pages associated with those images are shown in FIG. 9. At step 150, web server 124 provides an initialization web page, which may be retrieved by the user at, e.g., client 122 using a standard web browser.

At step 152, the user fills in blank fields in the initialization web page. For example, the user may be asked to supply credit card and billing information before being allowed to proceed. The user also selects the desired method for obtaining images. If the user selects the option "cache," the images are obtained from image cache memory 140. Images are drawn into cache 140 when users at clients 118, 120, and 122 use montage server process 136 on web server 124 to retrieve web pages with images (e.g., from web servers 126 and 128).

Montage applet 134 is downloaded to the client 122 at step 154 where it is automatically run by the web browser portion of web browser with montage applet 134. Several concurrent processes are performed at step 156. In process 158, montage server process 136 maintains a mapping list that associates image URLs with the URLs of the web pages that contain the images. In process 160, montage server process 136 and image server process 138 determine whether the images listed in the mapping file still exist in cache 140 (i.e., the images have not been overwritten) and, if the images exist, places the URLs of the images on a list of completely retrieved images. The completely retrieved images are transmitted to montage applet 134 on client 122 by montage server process 136 during process 162. Undesired URLs are filtered out during process 162 by comparing the text of the URLs to text strings provided by the user at client 122 that are indicative of pornographic or otherwise offensive or unwanted content. Images that correspond to undesired URLs are not transmitted to client 122 during process 162.

Montage applet 134 displays the transmitted images on the display of client 122 and maintains a list of the coordinates for each displayed image during process 164. In process 166, montage applet 134 waits for user input (e.g., in the form of a click on a given image).

If a user selects an image by clicking at a certain coordinate, montage applet 134 determines which image has been selected using the list of image coordinates maintained during process 164 and uses the mapping list maintained during process 158 to drive web browser with montage applet 134 to the web page containing the selected image at step 168.

If a user selects the option "create snapshot" during step 156, a snapshot image of the images in display memory 144 of client 122 are saved at step 170. The steps involved in creating a snapshot are described in connection with FIG. 5.

If the user selects the option "search" at step 152, the user is given an opportunity to enter search terms and a desired depth value at step 172. The search terms and depth are preferably entered as part of the initialization information provided by the user. Step 174 involves downloading montage applet 134 from web server 124 to client 122. At step 176, a search engine is run by montage server process 136 based on the search terms supplied by the user. The search generates one or more web pages of search results. At step 178, montage server process 136 extracts a list of URLs from the search results web pages generated at step 176. If desired, a filter may be used at step 178 to ensure that the extracted URLs only correspond to sites other than the site of the search engine. Such a filter excludes links to commercial entities associated with the search engine service.

If the user selects the option "web site" at step 152, the user is given an opportunity to enter information concerning web sites and web pages and a desired depth value as part of the initialization information, as shown by step 180. If desired, the user can enter a URL at step 180 from the currently displayed web page of a web browser. The web site and web page URLs entered by the user form a list of URLs. Montage applet 134 for client 122 is downloaded at step 182.

Several concurrent processes are performed at step 184. During process 186, server process 136 retrieves web pages based on the list of URLs obtained from step 178 or 180 and the desired depth. Process 186 is an iterative process. If the desired depth is 0, only the web pages corresponding to the URL(s) on the list are retrieved. If the desired depth is greater than 0, additional layers of web pages are retrieved. For example, if the depth is 1, web pages corresponding to links appearing on the web pages for the depth of 0 case are retrieved in addition to the web pages for the depth of 0 case. If the depth is 2, a further layer of web pages is retrieved. As the web pages are retrieved, montage server process 136 identifies the image URLs that are embedded in the web pages and constructs a mapping list that maps each image URL to the URL of the web page associated with that image.

In process 188, montage server process 136 passes the image URL for each image to image server process 138, which retrieves the image. When the image has been fully retrieved, image server process 138 notifies montage server process 136 and stores the image in image cache 140. In process 190, montage server process 136 transmits the completely retrieved images to montage applet 134 on client 122. If desired, images corresponding to web page URLs that match text strings indicative of pornographic or otherwise offensive or unwanted content can be excluded during process 190. Before transmitting the images, montage server process 136 obtains the user's criteria for undesired URLs (e.g., as part of step 152). Images corresponding to undesired URLs are then filtered out in process 190.

In process 192, montage applet 134 displays the transmitted images on the display of client 122 and maintains a list of the coordinates for each displayed image. To display images on the display, image data is placed in display memory 144. During process 194, montage applet 134 waits for input from the user.

If a user selects an image by clicking on a coordinate within the image, montage applet 134 determines the image URL for the selected image from its list of image coordinates maintained during process 192 and uses the mapping list constructed during process 186 to drive the web browser on client 122 to the web page that contains the selected image at step 168.

If a user selects the option "create snapshot" during step 184, a snapshot image of the images in display memory 144 of client 122 are saved at step 170. Creating the snapshot involves steps described in more detail in connection with FIG. 5.

With the system of FIGS. 8 and 9, images are drawn into image cache 140 whenever a user at a client uses montage server process 136 to initiate a search or enter URLs to define a group of web pages. To make this type of arrangement captivating for users, web servers such as web server 124 may be dedicated to particular subjects. With such an arrangement, the users who view images from the image cache of a given server will be able to quickly view images that are primarily associated with the subject matter of that server.

With the proxy server cache system of FIGS. 3 and 4, the community of users connected to proxy server 34 defines the type of images that are contained in cache 38.

If desired, the images supported by the montage system can be moving images, such as digital video files or digital animation files. The display of the images can be initiated by the user or may be invoked automatically. For example, images from an image cache or based on a default search or URL list could be displayed in place of a screen saver. When a certain amount of time (e.g., 5 minutes) has elapsed without any input from the user, the images are placed on the display.

The foregoing is merely illustrative of the principles of this invention and various modifications can be made by those skilled in the art without departing from the scope and spirit of the invention.

What is claimed is:

1. A method for use in a communications network in which a plurality of users at clients are connected to a data network, wherein the users access web pages that have associated web page images and are stored on servers connected to the data network, the method comprising the steps of:

obtaining a plurality of the images, each image being associated with one of the web pages, wherein the step of obtaining the images further comprises the substeps of, retrieving a group of web pages based on a list of universal resource locators (URLs), and retrieving the images associated with the group of web pages;

displaying the images on one of the clients without displaying the associated web pages;

allowing the user to select an image from among the displayed images; and accessing the web page associated with the selected image;

wherein each web page of said group of web pages is included in said list of universal resource locators or can be accessed by following links from one of the universal resource locators in said list of universal resource locators.

2. A method for use in a communications network in which a plurality of users at clients are connected to a data network, wherein the users access web pages that have associated web page images and are stored on servers connected to the data network, the method comprising the steps of:

obtaining a plurality of the images, each image being associated with one of the web pages, wherein the step of obtaining the images further comprises the substeps of, retrieving a group of web pages based on the universal resource locator (URL) of a web page currently displayed in a web browser, and retrieving the images associated with the group of web pages;

displaying the images on one of the clients without displaying the associated web pages;

allowing the user to select an image from among the displayed images; and accessing the web page associated with the selected image;

wherein each web page of said group of web pages can be accessed by following links from said web page currently displayed in the web browser.

3. The method defined in claim 2 wherein the step of displaying the images comprises the step of displaying images in random positions.

4. The method defined in claim 2 wherein the step of displaying the images comprises the step of displaying images in a non-overlapping pattern.

5. The method defined in claim 2 wherein the step of allowing the user to select an image from among the displayed images comprises the step of allowing a user to click on a displayed image.

6. The method defined in claim 2 wherein the step of accessing the web page associated with the selected image comprises the steps of:

determining the URL of the web page associated with the selected image; and driving a web browser to that URL.

7. The method defined in claim 2 further comprising the step of creating a snapshot of the displayed images.

8. The method defined in claim 2 wherein the data network is the Internet, the servers are web servers, and the images are inlined images.

9. A system for use in a communications network in which a plurality of users at clients are connected to a data network, wherein the users access web pages that have associated web page images and are stored on servers connected to the data network, the system comprising:
- means for obtaining a plurality of the images, each image being associated with one of the web pages, wherein the means for obtaining the images includes,
  - means for retrieving a group of web pages based on a list of universal resource locators (URLs), and
  - means for retrieving the images associated with the group of web pages;
- means for displaying the images on one of the clients without displaying the associated web pages;
- means for allowing a user to select an image from among the displayed images; and
- means for accessing the web page associated with the selected image;
- wherein each web page of said group of web pages is included in said list of universal resource locators or can be accessed by following links from one of the universal resource locators in said list of universal resource locators.

10. A system for use in a communications network in which a plurality of users at clients are connected to a data network, wherein the users access web pages that have associated web page images and are stored on servers connected to the data network, the system comprising:
- means for obtaining a plurality of the images, each image being associated with one of the web pages, wherein the means for obtaining the images includes,
  - means for retrieving a group of web pages based on the universal resource locator (URL) of a webpage currently displayed in a web browser, and
  - means for retrieving the images associated with the group of web pages;
- means for displaying the images on one of the clients without displaying the associated web pages;
- means for allowing a user to select an image from among the displayed images; and
- means for accessing the web page associated with the selected image;
- wherein each web page of said group of web pages can be accessed by following links from said web page currently displayed in the web browser.

11. The system defined in claim 9 wherein the means for displaying the images comprises means for displaying images in random positions.

12. The system defined in claim 9 wherein the means for displaying the images comprises means for displaying images in a non-overlapping pattern.

13. The system defined in claim 9 wherein the means for allowing the user to select an image from among the displayed images comprises means for allowing a user to click on a displayed image.

14. The system defined in claim 9 wherein the means for accessing the web page associated with the selected image comprises:
- means for determining the URL of the web page associated with the selected image; and
- means for driving a web browser to that URL.

15. The system defined in claim 9 further comprising means for creating a snapshot of the displayed images.

16. The system defined in claim 9 wherein the data network is the Internet, the servers are web servers, and the images are inlined images.

17. A method for use in a communications network in which a plurality of users at clients are connected to a data network, wherein the users access web pages that have associated web page images and are stored on servers connected to the data network, the method comprising the steps of:
- obtaining a plurality of the images, each image being associated with one of the web pages, wherein the step of obtaining the images further comprises the substeps of,
  - retrieving a group of web pages based on a list of universal resource locators extracted from the cache of web pages on a proxy server, and
  - retrieving the images associated with the group of web pages;
- displaying the images on one of the clients without displaying the associated web pages;
- allowing the user to select an image from among the displayed images; and
- accessing the web page associated with the selected image;
- wherein each web page of said group of web pages is included in said list of universal resource locators or can be accessed by following links from one of the universal resource locators in said list of universal resource locators.

18. A system for use in a communications network in which a plurality of users at clients are connected to a data network, wherein the users access web pages that have associated web page images and are stored on servers connected to the data network, the system comprising:
- means for obtaining a plurality of the images, each image being associated with one of the web pages, wherein the means for obtaining the images includes,
  - means for retrieving a group of web pages based on a list of universal resource locators extracted from the cache of web pages on a proxy server, and
  - means for retrieving the images associated with the group of web pages;
- means for displaying the images on one of the clients without displaying the associated web pages;
- means for allowing a user to select an image from among the displayed images; and
- means for accessing the web page associated with the selected image;
- wherein each web page of said group of web pages is included in said list of universal resource locators or can be accessed by following links from one of the universal resource locators in said list of universal resource locators.

19. The method of claim 1 wherein the step of retrieving a group of web pages employs a depth characteristic to control the retrieval process.

20. The method of claim 2 wherein the step of retrieving a group of web pages employs a depth characteristic to control the retrieval process.

* * * * *